(12) United States Patent
Liwell et al.

(10) Patent No.: US 8,191,150 B2
(45) Date of Patent: May 29, 2012

(54) METHOD AND ARRANGEMENT RELATING TO A COMMUNICATION DEVICE

(75) Inventors: Marcus Liwell, Malmö (SE); Stefan Andersson, Klågerup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1097 days.

(21) Appl. No.: 12/058,251

(22) Filed: Mar. 28, 2008

(65) Prior Publication Data

US 2009/0249487 A1    Oct. 1, 2009

(51) Int. Cl.
*G06F 21/00* (2006.01)
(52) U.S. Cl. ............................... 726/26; 726/10
(58) Field of Classification Search ............ 726/26, 726/10
See application file for complete search history.

(56) References Cited

U.S. PATENT DOCUMENTS

| 7,203,967 | B2 * | 4/2007 | Chmaytelli et al. ............ 726/30 |
| 2006/0031941 | A1 | 2/2006 | Xiao et al. |
| 2009/0172657 | A1 * | 7/2009 | Makelainen et al. ......... 717/174 |

FOREIGN PATENT DOCUMENTS

| EP | 1 564 957 A1 | 8/2005 |
| EP | 1 798 656 A2 | 6/2007 |

OTHER PUBLICATIONS

"Getting Started with J2ME", pp. 1-4, http://www.devarticles.com/c/a/Java/Getting-Started-with-J2ME/, Apr. 5, 2005.*
Patent Cooperation Treaty International Search Report corresponding to PCT/EP2008/061980 dated Apr. 29, 2009, 9 pages.

* cited by examiner

*Primary Examiner* — Nasser Goodarzi
*Assistant Examiner* — Lisa Lewis
(74) *Attorney, Agent, or Firm* — Harrity & Harrity, LLP

(57) ABSTRACT

The present invention relates to a novel method for handling applications in a device by associating an application signed by a domain certificate to a pre-defined entity in a device, said device comprising: a module reader for reading subscriber identity, a virtual machine for running at least one application, a memory containing a root certificate, the method comprising: using a data set for aggregating a sub set of data, modifying portion of said data set such that said portion includes reference to said entity. The invention also relates to a device for implementing the method.

28 Claims, 3 Drawing Sheets

METHOD AND ARRANGEMENT RELATING TO A COMMUNICATION DEVICE

BACKGROUND

The functionality of electrical devices, such as mobile telephones, PDAs, etc, can be enhanced by adding applications for carrying out specific instructions or introducing additional functionalities.

By using MIDlets (MIDlet is a term designating an application in the Java™ environment), applications are enabled by allowing them to access the equipment through an known or standardized interface. The control of the equipment may be dependent of the origin of the application. The origin is verified and validated by signatures and certificates linked to a root certificate in the equipment. Depending on the applications, the manufacturer or operator may be the origin of the application.

The fact that a MIDlet is signed by, e.g., an author certifies two issues: 1) that the author actually authored that MIDlet, and 2) that the MIDlet is in its original state (i.e., that it hasn't been modified by a third party).

The purpose of signing a MIDlet is 1) to gain access to security-sensible operations on the phone (such as sending an SMS, opening a TCP connection, etc.), and 2) ensuring that a (malicious) third party cannot present or pass off an altered MIDlet as the original.

A traditional MIDlet signing procedure may include generating a secure hash (also called message digest) of the MIDlet and encrypting the hash value with the private key of the signer. The signature may be checked by decrypting the encrypted hash value using the public key of the signer, and checking the decrypted mash value for equality with a computed hash of the received MIDlet. If the two (the signed hash, and the actual computed hash) are equal, it means that the MIDlet signature has been verified successfully.

The idea is that only the owner of the private key can sign the MIDlet (so that the signature is verified with the corresponding public key), and that any modification to the MIDlet after the signing will cause the signature verification to fail.

The user, i.e., the subscriber, is associated with an identification module, e.g., the SIM card (SIM) for example in a cellular communications system. The SIM is normally issued by the operator of the mobile telecommunications system to which the subscriber is subscribing. The operator wants to control that only his own applications are enabled in a phone with a SIM belonging to this operator.

In one version of MIDP (Mobile Information Device Profile 2.0), this may be solved by locating a root certificate in the SIM. The mobile phone contains logic such that the applications are only enabled when a SIM with the correct root certificate is inserted in the phone. A more detailed description of the prior art procedure may be found in the detailed description. In some cases operators have the operator root certificate stored on a memory in the phone.

Many applications for mobile devices are supplied by third parties. These applications may differ depending on manufacturers, regions, operators and device models. In many cases, for example for competition reasons, special applications may be offered to users of the devices, to make the products more attractive.

In case of mobile telephones, for example, when a Java MIDlet is signed with the manufacturer certificate or by any other domain certificate, the application is normally able to work in all phones that have the trusted root certificate to which the signing certificate is linked back. Normally, this is good; however it might not be in all cases, such as when, e.g., an application developer wants to limit the usage of one or several applications to a specific phone model or operator. At present, there are no secure ways to do so.

SUMMARY

According to one aspect, a method for associating an application signed by a domain certificate to a pre-defined entity in a device, said device comprising: a module reader for reading subscriber identity, a virtual machine for running at least one application, a memory containing a root certificate may include using a data set for aggregating a sub set of data, modifying portion of said data set such that said portion includes reference to said entity. Preferably, the set of data is a JAR (Java Archive) file. Preferably, the portion is a manifest of JAR. Preferably, the portion is a MIDlet certificate in a JAR file. According to one embodiment, the entity is one of a device model an operator of communication network, or a region.

Preferably, the manifest in the JAR file is extended with new attributes. The attributes state for which operator customized or branded device or which device model the application is allowed to be installed for or on. In an embodiment, a signer certificate that is used to sign the MIDlet may be provided with values identifying operator and/or model. A signer with a signer certificate may sign MIDlets for a specific operator and/or device model.

Preferably, during installation when the signer certificate is verified against a root certificate stored in the device and/or a memory unit communicating with said device, the verifier may verify that the device model and/or operator identity match signer certificate.

The method may further comprise the steps of: controlling a certificate and the JAR file, processing a manifest of the JAR, accessing an extended attribute value in the manifest, and setting application permission with respect to the value.

The invention also relates to a method of application building and packaging for generating a previously mentioned set of data. The method comprises the steps of: building a MIDlet corresponding to the data sub set generating JAD file corresponding to the data set, generating MANIFEST.MF file is generated based on a JAD, packaging the application, signing the application using jarsigner, adding values into a signer certificate that is used to sign the MIDlet, updating a MIDlet-Jar-Size in the JAD, adding the certificate to the JAD, and adding the signature the JAD.

The step of adding values may be carried out in two ways: extension in the manifest with the new attributes which will be verified by the tool that signed the JAR that the value is correct, or using a specific signer certificate for each value, which will be the same step as in signing any other MIDlet except that an especial dedicated signer certificate is used.

The invention also relates to a device comprising a module reader for reading subscriber identity, a virtual machine for running at least one application, a memory containing a root certificate, and a processing unit. The processing unit is configured to: access a data set for aggregating a sub set of data, process and identify a portion of the data set, which portion comprises reference to an entity and associate an application signed by a domain certificate to a pre-defined entity in the device. Preferably, the data set is a JAR (Java Archive) file. Preferably, the portion is a manifest of JAR. Preferably, the portion is a MIDlet certificate in a JAR file.

In a preferred embodiment the entity may be device model, an operator of communication network and/or a region identity.

The device may be any of a mobile telephone terminal, a communicator, a smart phone, PDA, or a portable computer.

The invention also relates to a computer program product comprising a computer code for associating an application signed by a domain certificate to a pre-defined entity in a device. The computer code comprises a first instruction set for aggregating a sub set of data, the first instruction set further comprising a portion comprising a reference to the entity. In the preferred computer program product, the first instruction set is a JAR (Java Archive) file. In the preferred computer program product, the portion is a manifest of JAR. In the preferred computer program product, the portion is a MIDlet certificate in a JAR file. In the preferred computer program product, the entity is a device model, and operator of communication network and/or a region.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 schematically illustrates a security model and location of various root certificates in a communication device.

DETAILED DESCRIPTION

In the following description, the invention is exemplified with reference to a mobile telephone operating in a telecommunications network. The mobile telephone is normally linked to a subscriber and a specific telephone number by means of the SIM card, which is an active (smart) card inserted in the telephone. However, an internal special memory may also serve for same purpose. The mobile phone is provided with a reader for retrieving information from the SIM card and may also write information to the card, e.g., using it as a memory for storing phone number etc, as is known in the art.

Applications may be downloaded to the phone and run on a special platform, a so-called virtual machine, usually implemented as a Java™ environment. The invention does not exclude other kinds of third party applications, such as native code, and the phone may be an open phone based on any operative systems, which can implement a mechanism similar to the Java environment. Moreover, the invention may be applicable to other mobile terminals, which may be a communicator, a smart phone, PDA, a portable computer, etc.

Generally, embodiments described herein relate to the association of an application, such as a music application, a program, a video application etc., signed by a domain certificate to a pre-defined entity in a device. The device in its simplest form may include a module reader for reading subscriber identity, a virtual machine for running at least one application, and a memory containing a root certificate. Thus, a set of data, e.g., a JAR (Java Archive) file which is for aggregating a subset of data, is modified by a modifying portion, such as the manifest of JAR or MIDlet certificate in the JAR file, of the data set such that the portion refers to the entity.

Figure 1:
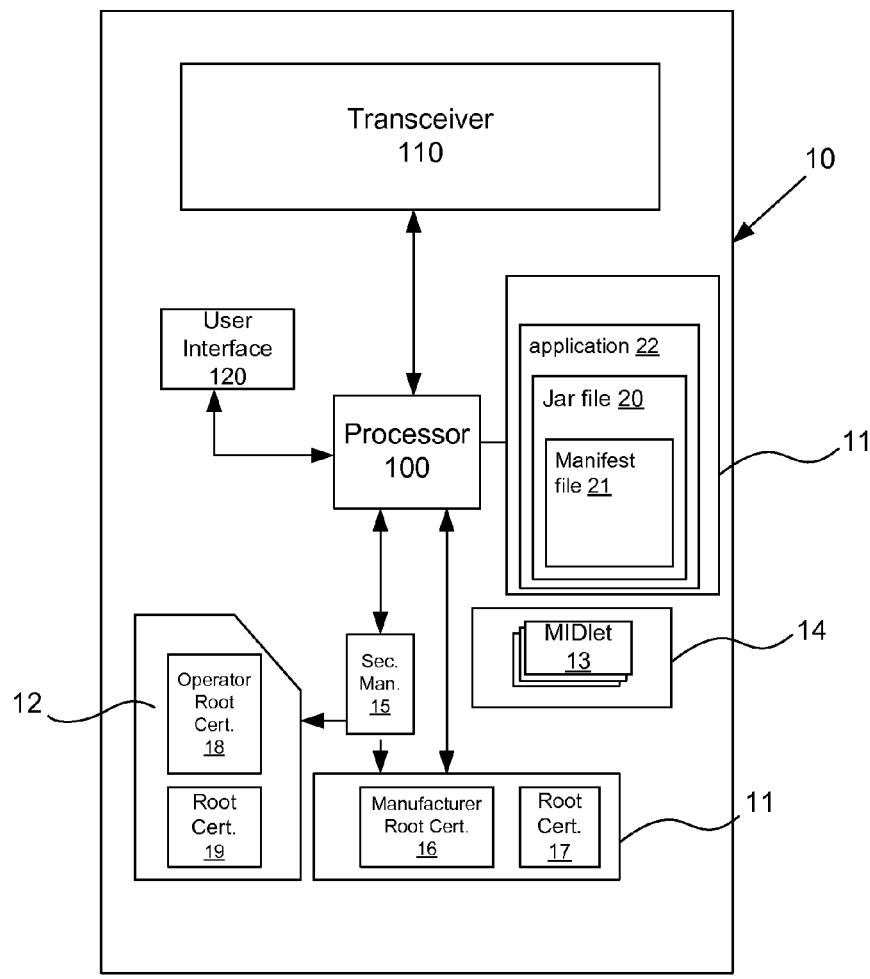

FIG. 1 illustrates an example of a device 10, such as a mobile terminal, that includes a memory 11 and a SIM card 12. A number of MIDlets 13 may be configured to run in a virtual machine 14, which can be a part of processor 100 of device 10. A security controller 15 may control the access to device 10 by MIDlets 13. Security controller 15 may need information from the root certificates 16, 17, 18 and 19. Root certificates 16-19 may be stored in different memories. For example memory 11, which can be, e.g., a RAM (Random Access Memory) or flash memory or similar, may contain Manufacturer Root Certificate 16 and a first root certificate 17. SIM card 12 may store an Operator root certificate 18 and another root certificate 19.

When a MIDlet 12 is installed or downloaded to device 10, the signature may be verified by reading the certificate chain from the ".jad" file stored in the device. A root certificate may be retrieved from device 10 or from SIM card 12. Then the certificate chain may be validated and linked to a specific root certificate. Next, the MIDlet may be assigned to the domain defined by the root certificate. Memory 11 (or other memory) may be used to store applications 22.

Device 10 may further comprises processor 100 which controls and executes different functions of the phone, a user interface 120 for communication with the user and a transceiver 110, including transmitter and receiver portions.

According to a first embodiment described herein, the manifest of a JAR (Java Archive) file of an application may be used to achieve the objectives of the invention.

Typically, a standalone Java application is downloaded using the JAR file. The JAR file, as implemented according to embodiments described herein, may comply with the JAR File Specification from Sun Microsystems (hereinafter "the JAR specification") while incorporating additional elements to facilitate application limitations according to the present invention. In compliance with the JAR specification, JAR files may include a collection of class files and any extensions necessary to execute the application. Because class files are typically compressed within JAR files, JAR files are suitable for packaging and delivering Java applications.

Figure 2:
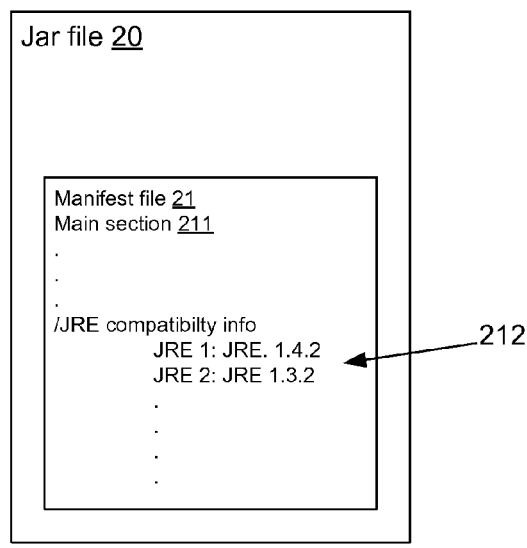
FIG. 2 is a block diagram over a JAR file.

In addition to its class files, the depicted embodiment of JAR file 20, as illustrated in FIG. 2, includes a JAR manifest file 21. JAR manifest file 21, as described in the JAR Specification, has a main section 211 and may include one or more individual sections (which are not shown) and individual sections 212, fully described in the JAR specification. Main section 211 contains information such as manifest version information indicating the manifest file version, vendor/version information indicating the version and vendor of the Java implementation used to generate the manifest file, and "Main class" information indicating the relative path of the main application class which the launcher will load at startup time.

JAR manifest file 21 may further include JRE compatibility information. JRE compatibility information indicates a list of JRE vendors and JRE versions that are compatible with the application. If the application developer has not provided JRE compatibility information with the application, the highest version of the JRE in the system will be the preferred JRE. In the depicted embodiment, the JRE compatibility information includes a prioritized listing of compatible JREs. Thus, the depicted example of JRE compatibility information includes a set of entries indicating a JRE version and (optionally) vendor. Like most other entries in JAR file manifest, each JRE compatibility entry is formatted as a name-value pair. Name-value pairs, derived from Internet Engineering Task Force (IETF) RFC 822 (Standard for the Format of ARPA Internet Text Messages) refer to a simple format for specifying parameter values in which text indicating a parameter name is followed by a colon (:), a space, and text indicating the parameter's value. The identification of compatible JREs in manifest entries in addition to identifying a JRE version number may also optionally identify a vendor name, an operating system name, or a particular architecture.

JRE compatibility information may include a first entry specifying a JRE version number only and a second entry specifying a JRE version as well as a vendor. A third entry may indicate a JRE version number, a vendor, and an operating system. The interpretation of this example of compatibility information is that the application is compatible with and prefers to execute under any implementation of, e.g., JRE version 1.4.2 without regard to vendor or operating system. If JRE 1.4.2 is not available, compatibility entry indicates that JRE 1.3.2 may be used if the vendor is Sun Microsystems, and so on.

The individual sections define various attributes for packages or files contained in this JAR file. Not all files in the JAR file need to be listed in the manifest as entries, but all files which are to be signed should be listed. The manifest file itself should not be listed.

If there are multiple individual sections for the same file entry, the attributes in these sections may be merged. If a certain attribute have different values in different sections, the last one is recognized.

Following is a more detailed sample of the JAR manifest
Manifest-Version: 1.0
MIDlet-Name: MyApp
Created-By:
MIDlet-Push-1:
MIDlet-1:
MicroEdition-Configuration:
Ant-Version:
MIDlet-Icon:
MIDlet-Vendor:
MIDlet-Permissions: javax.microedition . . .
MIDlet-Version: 1.0.67
MicroEdition-Profile: MIDP-2.0
MIDlet-Description: MyApp MIDlet Thus, according to the first embodiment described herein, the manifest in the JAR file may be extended with new attributes that will state for which operator customized phone or which device/phone model the application is allowed to be installed for or on. The new attributes may include: xzy-Access-Model: model1, model2, and xzy-Access-Operator: MyOwnOperator, wherein xzy denotes a manufacturer identity, Modeln denotes a device model identity, and MyOwn-Operator denotes e.g., a telecom operator identity.

It should be noted, however, that it is not necessary that the phone or device be an operator-customized phone, as it could also be an operator-identified phone, i.e., it could be a generic phone with a SIM, whereby the SIM indicates which operator that controls the phone at the moment when the MIDlet is installed; when the user changes SIM to a different operator (or service provider), the application can in this case be deactivated. This means that an operator-customized phone can be more than an operator-branded phone.

After the application has been signed with an authorized signer's certificate, such as the operator, a manufacturer or a third party certificate, it will not be possible to change the manifest of the application. Thus, it can run on a device that is not customized to a specific operator because the signature covers the entire JAR file.

Figure 4:
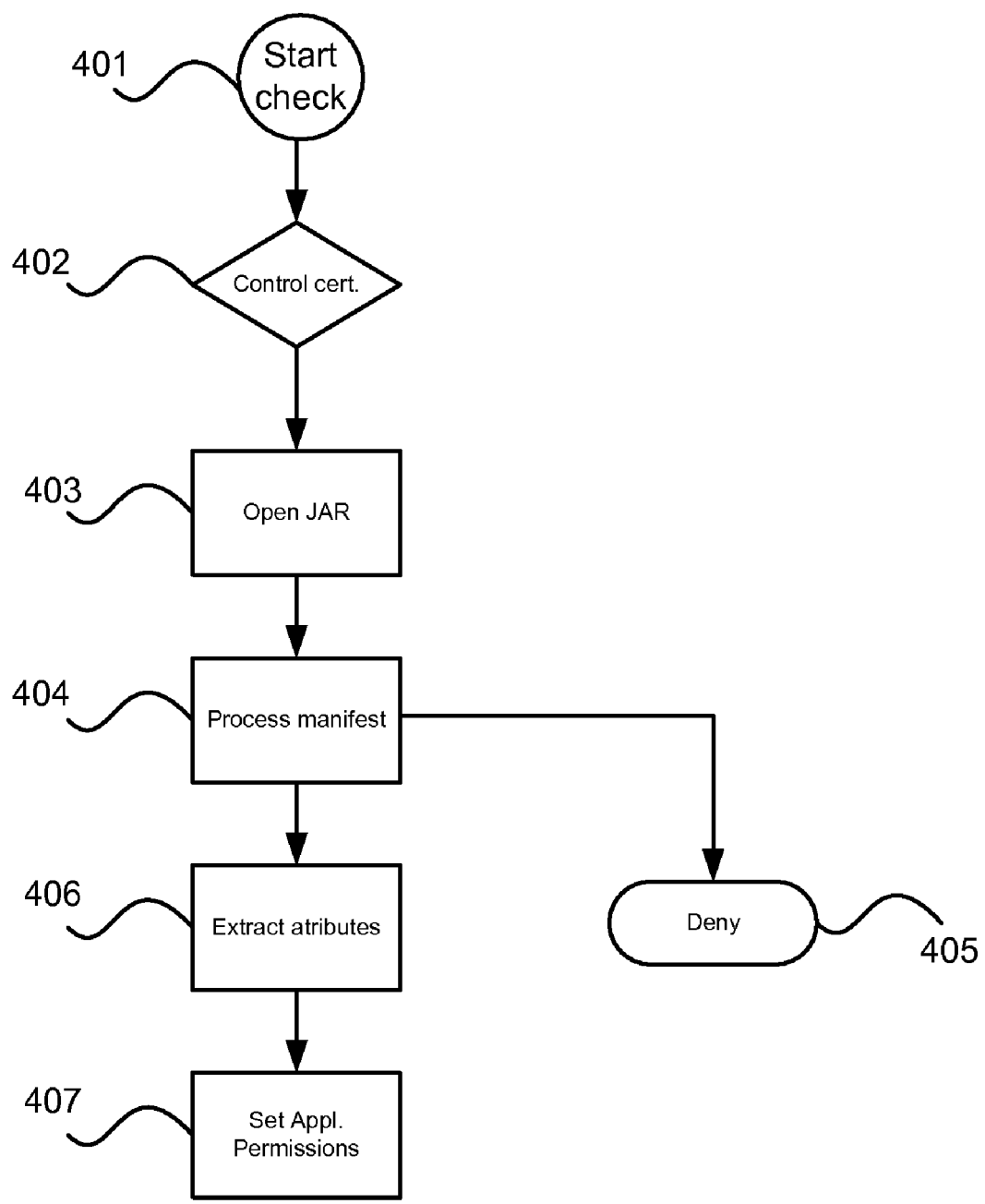
FIG. 4 is a flow diagram illustrating parts of the step of executed in a device according to the invention.

With reference to FIG. 4, in the device, upon start of an application check (block 401), the security manager controls the certificate (block 402). The JAR file associated with the application may be accessed (block 403) the manifest of the JAR file is processed 404. If the certificate is not correct, the access permission is denied (block 405). The extended or new attributes are may be extracted (block 406) and the attribute values are set to the application permissions in the device (block 407).

According to the second embodiment described herein, the above-described problem may be solved by including values, i.e., the operator and/or model identifier, into the signer certificate that is used to sign the MIDlet. The information may either be added in the subject field of the certificate or as a proprietary value to, e.g., the Enhanced Key Usage filed of the certificate. In this way the signer that has received a signer certificate can only sign MIDlets for a specific operator and/or phone model. Then, during installation when the signer certificate is verified against the root certificate stored in the phone, or the SIM, the verifier will also verify that the phone model match the phone model stated in the signer certificate.

Figure 3:
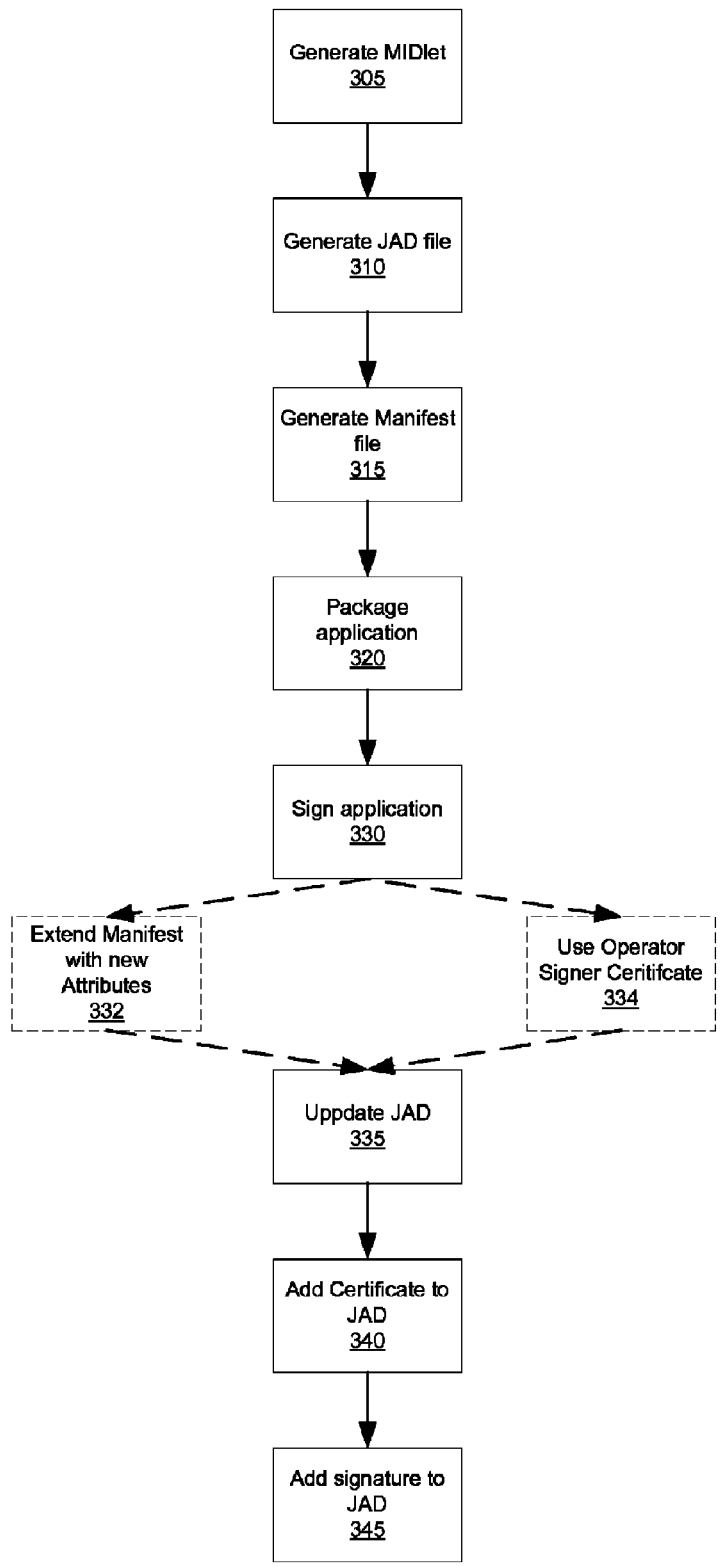
FIG. 3 is a flow diagram illustrating parts of the steps of the invention.

FIG. 3 is a flow diagram illustrating exemplary processing for building and packaging and application. Processing may begin with a MIDlet being built (block 305). A JAD file may be generated (block 310). A MANIFEST.MF file may be generated based on the JAD file (block 315). It should be noted that blocks 310 and 315 may be completed, e.g., using a wtkJad Antenna task.

Next, the application may be packaged (block 320). The application may be signed using, for example, jarsigner, which generates signatures for JAR files, and verifies the signatures of signed JAR files (block 325).

Values for the operator and/or model identifier may be added into the signer certificate that is used to sign the MIDlet (block 330). This can be done in two ways, as shown by the dashed lines in FIG. 3. In a first implementation (block 332), this task may be accomplished extension in the manifest with the new attributes which will be verified by the tool that signed the JAR that the value is correct. Thus, this step may be a tool that uses the jar signer or any other tool to do the signing step.

In a second implementation (block 334), this task may be accomplished by using a specific signer certificate for each operator, which will be the same step as in signing any other MIDlet, except that an special dedicated signer certificate is used, i.e., many different signer certificates will be available to be used depending on which operator(s) the MIDlet should work for. It is of course possible to sign with more than one certificate.

Next, the MIDlet-Jar-Size in JAD may be updated (block 335). The certificate may be added to the JAD (block 340) and the signature may be added to the JAD (block 345). The application may then be deployed and downloaded into the mobile phone, using any uploading functionality. Deploying and downing of the application may be performed via any suitable interface, such as the Internet, over Bluetooth or Infrared, or via a cable, depending on the phones features.

Referring back to FIG. 1, security manager 15 may control the access of the MIDlets 13 to device 10. When a MIDlet 12 of a certain application is installed or downloaded, the signature is verified by reading the certificate chain of the ".jad" file stored in the device. The root certificate is retrieved from the device 10 or from the SIM card 12. Then the certificate chain is validated and linked to a specific root certificate. In next step, the MIDlet may be assigned to the domain defined by the root certificate. During installation of the application, the values used when signing the MIDlet certificate are compared with the information stored in the memory of the phone, e.g., phone model (or model range) in the memory 11 or the operator id in the SIM (or other memory) 12 and if the values agree with the stored values, the application is allowed to run.

Embodiments described herein have many advantages. For example if an application, which can any type such as music, graphics, office etc., is developed by a third party company which a phone manufacturer wants to use for special operator in one or several countries, then the application can be locked down to the operator and/or model/range of models.

In another case an application developed by a third party company may be used by the manufacturer for a range of phones and it will not be possible to install the application in another models.

Portions of the present invention may be wholly or largely implemented as a set of computer executable instructions (computer software). The computer executable instructions are typically stored on a permanent storage device such as a hard disk, magnetic tape, CD ROM, flash memory device, and the like. During times when portions of the software are being executed, the instructions may reside in a dynamic storage element such as a system memory or an internal or external cache memory.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

What is claimed is:

1. A method comprising:
   receiving, by a device, an application signed with a domain certificate;
   storing, by a memory associated with the device, a root certificate and a Java Archive (JAR) file;
   modifying, by the device, a portion of the JAR file to include a reference to an entity;
   determining, by a module reader associated with the device, a subscriber identity associated with the device;
   determining, by the device, whether the domain certificate, used to sign the application, corresponds to the reference and the root certificate; and
   installing, by the device, the application when the domain certificate corresponds to the reference and the root certificate.

2. The method of claim 1, where said portion is a manifest associated with the JAR file.

3. The method of claim 2, where modifying the portion of the JAR file includes:
   extending said manifest in said JAR file to include one or more attributes, and
   where the reference is based on the one or more attributes included in the extended manifest.

4. The method of claim 2, further comprising:
   accessing an extended attribute value in said manifest; and
   setting an application permission with respect to said extended attribute value.

5. The method of claim 1, where said portion is a MIDlet certificate in the JAR file.

6. The method of claim 5, where modifying the portion of the JAR file includes:
   using a signer certificate to sign said MIDlet with values identifying at least one of an operator associated with the device or a model associated with the device.

7. The method of claim 1, where said entity is device model associated with the device.

8. The method of claim 1, where said entity is an operator of a communication network to which the device is coupled.

9. The method of claim 1, where said entity is a region associated with the device.

10. The method of claim 3, where said one or more attributes relate to at least one of:
    a user associated with the device,
    a service provided associated with the device,
    a brand of the device, or
    a model of the device.

11. The method of claim 6, where a signer, associated with the signer certificate, signs the MIDlet using the signer certificate, to identify for the at least one of the operator associated with the device or the model associated with the device.

12. The method of claim 1, further comprising:
    building a MIDlet associated with the device;
    generating a java application descriptor (JAD) file corresponding to said MIDlet;
    generating a MANIFEST.MF file based on the JAD file;
    packaging said application based on the JAD file;
    signing said application using jarsigner;
    adding values into a signer certificate that is used to sign said MIDlet;
    updating a MIDlet-Jar-Size value included in said JAD file;
    adding said signer certificate to said JAD file; and
    adding said signature to said JAD file,
    where the JAR file is based on the JAD file that includes the updated MIDlet-Jar-Size value, the signer certificate, and the signature.

13. The method of claim 12, where signing said application using jarsigner includes at least one of:
    verifying values associated with attributes included in an extension in the MANIFEST.MF file using a tool that added the signature to the JAD file, or
    using a specific signer certificate for each of the values associated with the extension in the MANIFEST.MF file.

14. A device comprising:
    a module reader which reads a subscriber identity associated with the device;
    a virtual machine which runs at least one application signed with a domain certificate;
    a memory which contains a root certificate and a data set; and
    a processing unit which:
        identifies a portion, of said data set, that comprises a reference to an entity, where the reference differs from the subscriber identity,
        determines whether the domain certificate, signing the at least one application, corresponds to the subscriber identity and the reference to the entity, and
        enables the virtual machine to install the at least one application when the domain certificate corresponds to the subscriber identity and the reference to the entity.

15. The device of claim 14, where said data set is a Java Archive (JAR) file.

16. The device of claim 15, where said portion is a manifest of the JAR file.

17. The device of claim 15, where said portion is a MIDlet certificate in the JAR file.

18. The device of claim 14, where said entity is associated with a device model associated with the device.

19. The device of claim 14, where said entity is related to an operator of the communication network associated with the device.

20. The device of claim 14, where said entity is related to a region associated with the device.

21. The device of claim 14, where said device comprises at least one of:
- a mobile telephone terminal,
- a communicator,
- a smart phone,
- a personal data assistant (PDA), or
- a portable computer.

22. A non-transitory memory device comprising:
- one or more instructions which, when executed by a processor, cause the processor to receive an application signed by a domain certificate;
- one or more instructions which, when executed by the processor, cause the processor to read a subscriber identity associated with the device;
- one or more instructions which, when executed by the processor, cause the processor to identify a portion, of a data set associated with the device, that comprises a reference to an entity, where the reference differs from the subscriber identity;
- one or more instructions which, when executed by the processor, cause the processor to determine whether the domain certificate, signing the application, corresponds to the subscriber identity and the reference to the entity; and
- one or more instructions which, when executed by the processor, cause the processor to prevent the application from being installed when the domain certificate does not correspond to at least one of the subscriber identity or the reference to the entity.

23. The memory device of claim 22, where the data set includes a Java Archive (JAR) file.

24. The memory device of claim 23, where said portion is a manifest of the JAR file.

25. The memory device of claim 23, where said portion is a MIDlet certificate included in the JAR file.

26. The memory device of claim 22, where said entity is a device model associated with the device.

27. The memory device of claim 22, where said entity is an operator of a communication network associated with the device.

28. The memory device of claim 22, where said entity is a region associated with the device.

* * * * *